(12) United States Patent
Brownlee et al.

(10) Patent No.: US 6,449,480 B1
(45) Date of Patent: Sep. 10, 2002

(54) RADIO TELEPHONE SYSTEM

(75) Inventors: Jeffrey Brownlee, Hampshire (GB); Knut Ingo Haberland-Schlosser, Bochum (DE)

(73) Assignee: Nokia Mobile Phones Ltd., Espoo (FI)

( * ) Notice: Subject to any disclaimer, the term of this patent is extended or adjusted under 35 U.S.C. 154(b) by 998 days.

(21) Appl. No.: 08/547,736

(22) Filed: Oct. 26, 1995

(51) Int. Cl.[7] .............................. H04Q 7/30; H04Q 7/38
(52) U.S. Cl. ........................ 455/435; 455/450; 455/515; 455/561
(58) Field of Search ........................ 379/61, 60, 63, 379/58, 59; 455/33.1, 53.1, 54.1, 33.2, 426, 435, 450, 515, 512, 462, 463, 464, 465, 507, 509, 517, 561

(56) References Cited

U.S. PATENT DOCUMENTS

| 4,737,977 A | * | 4/1988 | Norman ..................... 379/63 X |
| 4,984,290 A | * | 1/1991 | Levine et al. ............... 455/33.2 |
| 5,257,257 A | | 10/1993 | Chen et al. .................... 370/18 |
| 5,325,419 A | * | 6/1994 | Connolly et al. ............. 379/60 |
| 5,387,905 A | * | 2/1995 | Grube et al. ........... 455/56.1 X |
| 5,475,689 A | * | 12/1995 | Kay et al. ...................... 379/63 |
| 5,526,357 A | * | 6/1996 | Jandrell ...................... 370/346 |
| 5,544,159 A | * | 8/1996 | Ablay ......................... 370/281 |
| 5,548,631 A | * | 8/1996 | Krebs et al. ........... 455/53.1 X |
| 5,613,196 A | * | 3/1997 | Barnes et al. ............... 455/54.1 |

* cited by examiner

Primary Examiner—Marsha D. Banks-Harold
Assistant Examiner—Martin Lerner
(74) Attorney, Agent, or Firm—Perman & Green, LLP

(57) ABSTRACT

A DECT-like radio telephone system in which a base station alerts the handsets of the system to an incoming call by transmitting a signal analogous to {LCE-PAGE-REQUEST} signal of a type that specifies no single handset. In response to the signal, the handsets activate alerting means to alert users of the handsets to the need to answer the call. The use of an {LCE-PAGE-REQUEST} signal avoids the need for DLC (Dynamic Link Control) links to be established between the handsets and the base station when the handsets are to be alerted to the call.

16 Claims, 4 Drawing Sheets

RADIO TELEPHONE SYSTEM

BACKGROUND OF THE INVENTION

1. Field of the Invention

Figure 1:
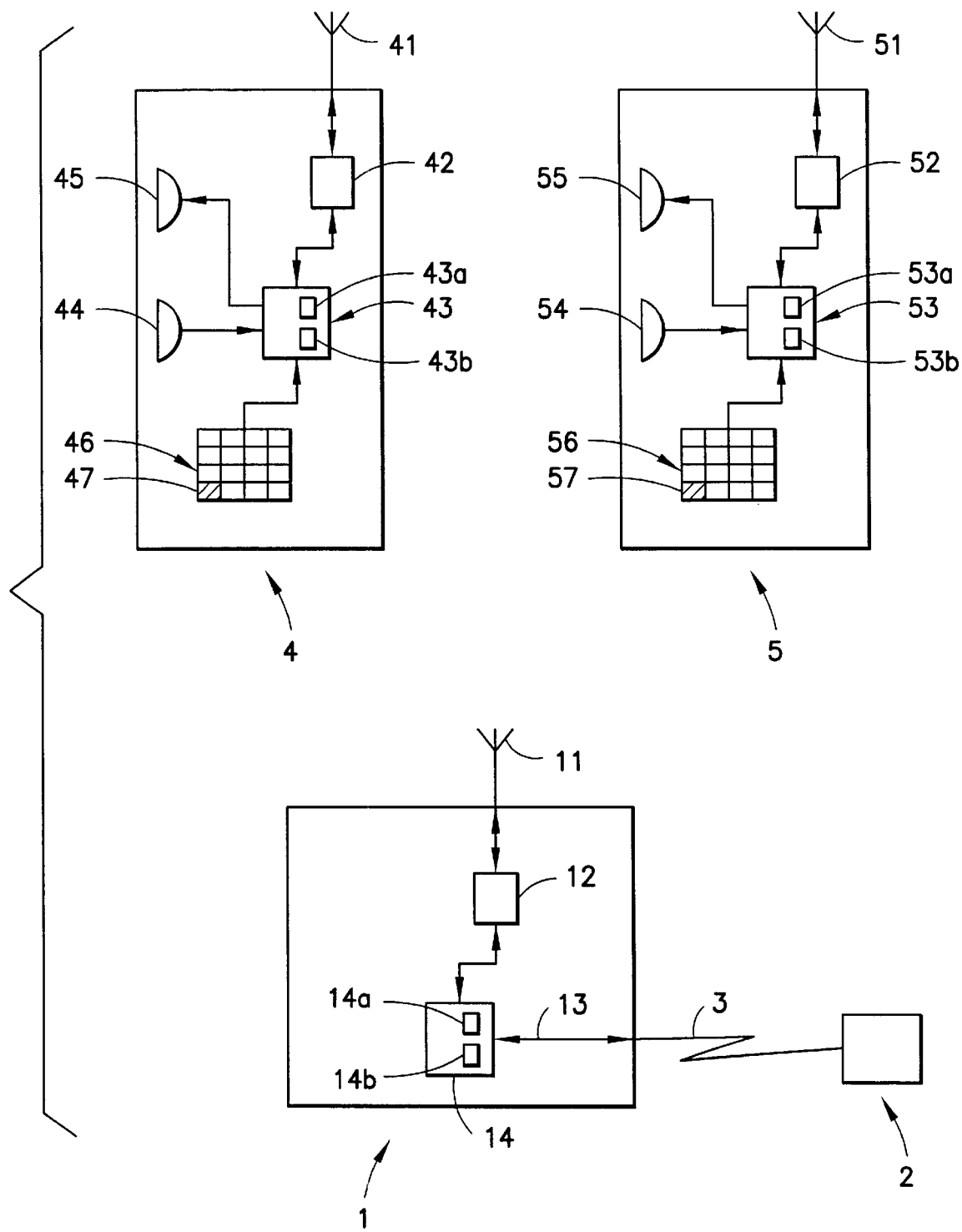

This invention relates to radio telephones and base stations for such radio telephones and to a method of communication in radio telephone systems.

2. Description of the Prior Art

One type of radio telephone system to which the invention relates is DECT (Digital European Cordless Telecommunications). A DECT system typically includes at least one fixed part, comprising one or more base stations, and several portable parts, or handsets. The handsets communicate with a base station using an over the air radio carrier which is divided into time slots. The base station may be connected to a standard wireline telephone system and the handsets may then communicate with the wireline system through the base station. The handsets may also communicate with each other through the base station. Most communication between the base station and a handset requires a communication link—that is a link for bi-directional communication between the base station and the handset. Each communication link uses two time slots, one for communications from the base station to the handset and one for communications in the opposite direction.

When an incoming telephone call is received by the base station (for example from the wireline system or from one of the handsets of the radio telephone system to another) and is to be directed to a single one of the handsets a standard protocol is used to establish a communication link between the base station and the handset. The base station first issues a broadcast ("B-format") paging signal whose contents specify the handset to be called. In response to this the handset specified in the signal establishes a bi-directional point-to-point communication link with the base station by replying with an "S-format" {LCE-PAGE-RESPONSE} signal; the incoming call is routed to that link via a {CC-SETUP} message; the handset and the base station negotiate the communication format to be used over the link; the handset then alerts its user (for example by ringing, or flashing a LED, or by other alerting means); the handset transmits a {CC-ALERTING} signal to the base station; and if the user answers the call (for example by pressing a key on a keypad of the handset) the handset transmits a {CC-CONNECT} signal to the base station, the base station answers with a {CC-SETUP-ACK} signal and the voice (or data) signal of the incoming call is connected over the link to the handset. The handset may be configured to answer the call automatically so that the user does not need to press a key.

If an incoming call is not to be directed to a single one of the handsets it can be useful for as many of the handsets as possible to be alerted to the call so that a user of any of those handsets may answer it. One way to achieve this is with a similar system to the one described above—that is to use one paging signal directed specifically to each individual handset to inform each handset of the call. However, this requires a communication link using two communication slots for each handset that is to ring, and the number of slots is limited. Therefore, in a system with numerous handsets it may not be possible to establish a communication link with every handset simultaneously. For instance, in a DECT system with 24 available slots no more than 12 handsets could be alerted simultaneously in this way.

SUMMARY OF THE INVENTION

According to a first aspect of the present invention there is provided a base station for a DECT-like radio telephone system comprising at least one handset, the base station comprising base station communication means for transmitting signals to the handset; and base station processing means responsive to an incoming call to the base station for causing the base station communication means to transmit a signal analogous to an {LCE-PAGE-REQUEST} signal of a type that specifies no single handset.

According to a second aspect of the present invention there is provided a handset for a DECT-like radio telephone system comprising a base station, the handset comprising handset communication means for receiving signals from the base station; alerting means; and handset processing means responsive to the handset communication means receiving a signal analogous to an {LCE-PAGE-REQUEST} signal of a type that specifies no single handset for activating the alerting means.

The system preferably includes more than one handset. The communication means of the base station and of the handsets preferably each include an antenna and a transceiver connected to the respective processing means. Preferably both a base station and a handset according to the invention are provided.

Preferably, the base station processing means is responsive to a signal from a first handset requesting a call to be set up while the incoming call remains unanswered for causing the base station to route the call to the first handset. Preferably, the base station processing means is responsive to a subsequent signal from a second handset requesting a call to be set up for causing the base station communication means to transmit a signal to reject the request from the second handset The signal requesting a call to be set up is suitably a signal for establishing bi-directional communication with the base station, for example a signal conventionally used for that function such as a signal analogous to an {LCE-PAGE-RESPONSE} signal. Preferably, this is a point-to-point "S-format" signal.

The signal analogous to an {LCE-PAGE-REQUEST} signal of a type that specifies no single handset suitably has first and second type digits which are both hexadecimal F. Suitably the seventh least significant TPUI bit of that signal is 1. Suitably the four least significant TPUI bits of the signal specify an alerting type to be used by the handset. Preferably, the base station transmits the signal as a broadcast ("B-format") signal. Preferably, a DLC (Data Link Control) link between the base station and the handset is unnecessary for the base station communication means to transmit the signal.

The base station processing means is preferably responsive to the incoming call being released for causing the base station communication means to transmit a signal indicating that the call has been released. That signal preferably specifies no single handset.

Signals that specify no single handset preferably specify no handset or group of handsets. Any portions of those signals conventionally used to specify a handset or group of handsets are preferably used for another function, most preferably to specify the action to be taken by handset processing means on receipt of the signals by handset communication means.

The handset processing means is preferably responsive to the handset communication means receiving a signal analogous to an {LCE-PAGE-REQUEST} signal of a type that specifies no single handset, and that has at least one TPUI bit specifying that the alerting means is to be deactivated, for deactivating the alerting means.

According to a third aspect of the invention there is provided a method for communication between a base station and a handset in a DECT-like radio telephone system, the method comprising:

in response to an incoming call to the base station, transmitting from communication means of the base station a signal analogous to an {LCE-PAGE-REQUEST} signal of a type that specifies no single handset; and in response to communication means of the handset receiving that signal, activating alerting means of the handset.

The term 'DECT-like radio telephone system' includes any radio telephone system that uses an analogous communication protocol to that of the DECT system, irrespective of the terminology applied to the system's signalling. This includes the DECT system itself, WCPE (Wireless Customer Premises Equipment), PHS (Personal Handyphone System) and DCT900. The term 'signal analogous to an {LCE-PAGE-REQUEST} signal' includes DECT's {LCE-PAGE-REQUEST} signals and signals of DECT-like radio telephone systems having functions analogous to those of the {LCE-PAGE-REQUEST} signal in a DECT system. Similarly, the term 'signal analogous to a {CC-SETUP} signal' includes DECT's {CC-SETUP} signals and signals of DECT-like radio telephone systems having functions analogous to those of the {CC-SETUP} signal in a DECT system.

DETAILED DESCRIPTION OF THE EMBODIMENT

Figure 2:
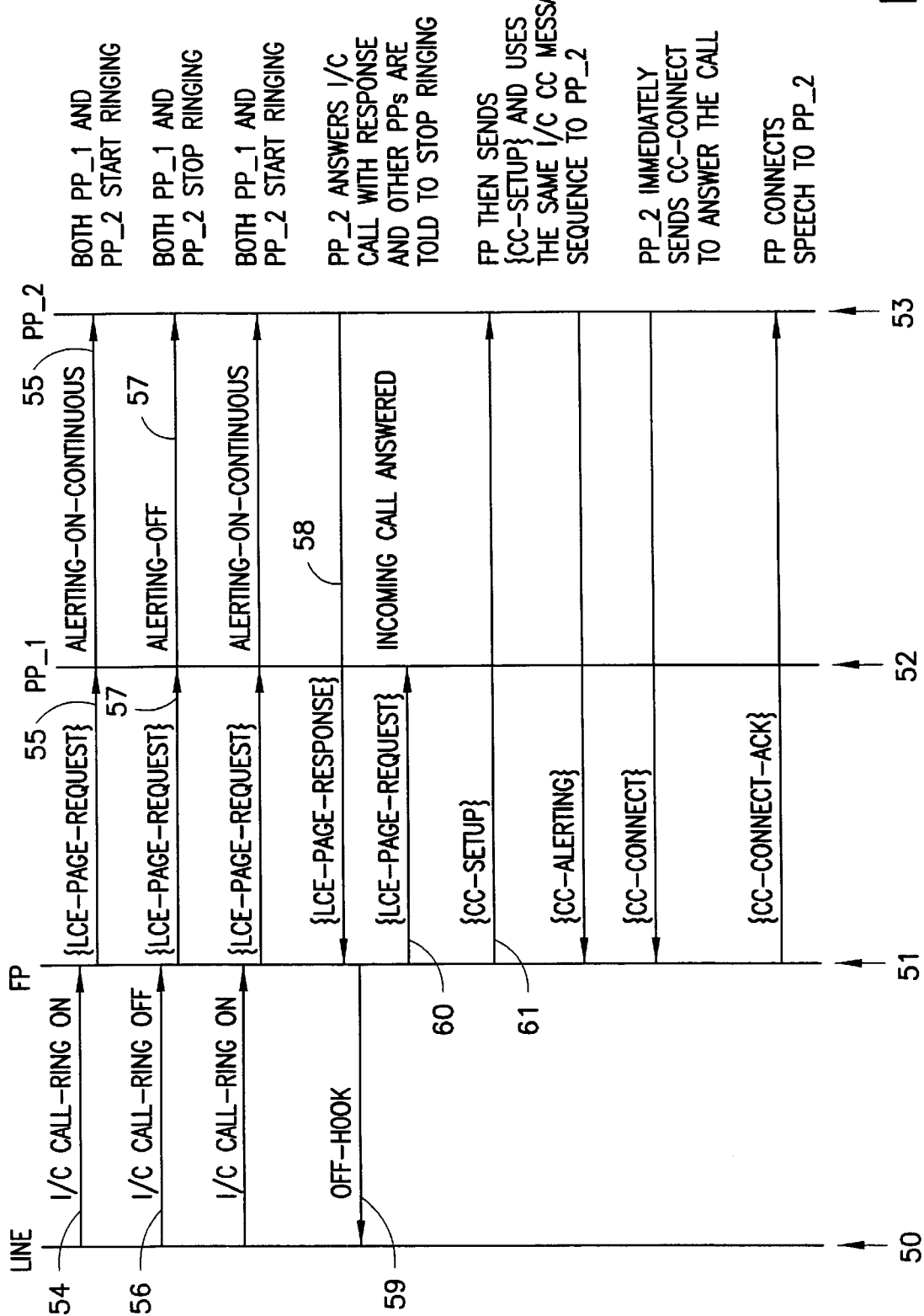
Figure 3:
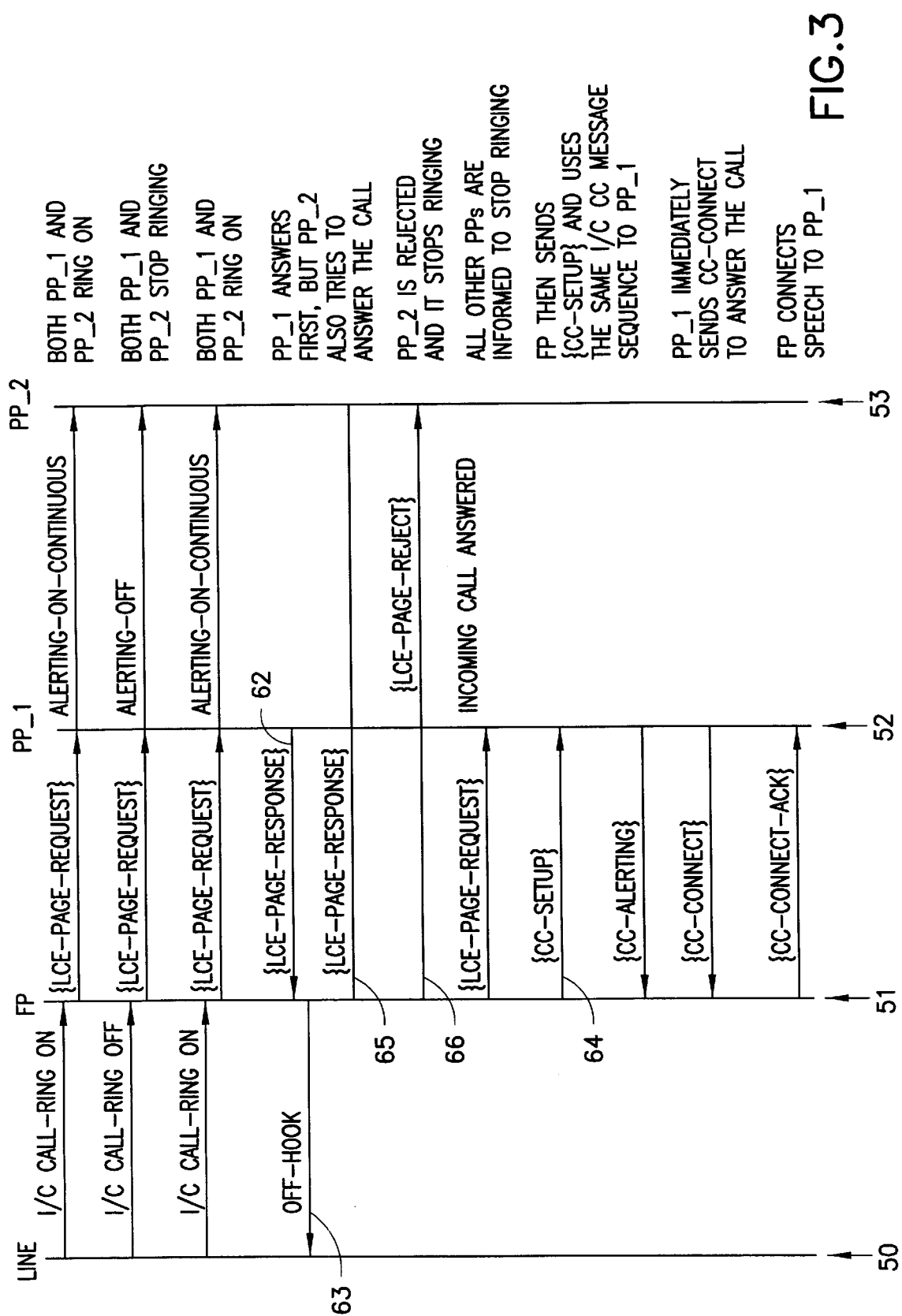
Figure 4:
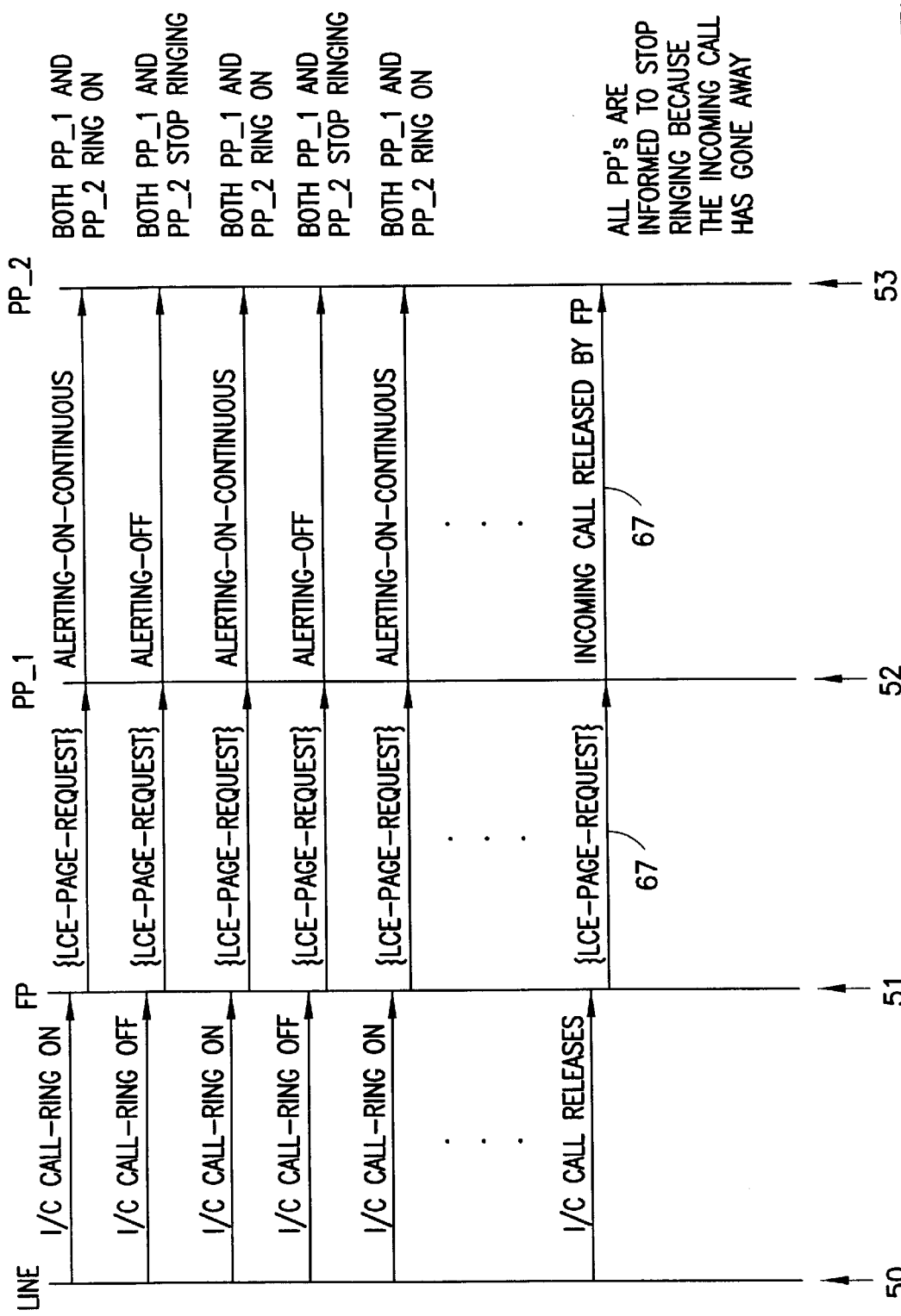

The present invention will now be described by way of example with reference to the accompanying drawings in which:

FIG. 1 is a schematic diagram of a DECT radio telephone system according to the present invention; and FIGS. 2 to 4 are diagrams illustrating the operation of aspects of the invention.

FIG. 1 shows a base station 1 of the radio telephone system. The base station is connected to a second telephone system 2, for example a wireline analogue PSTN telephone system, by a cable connection 3. Of course, the connection with the second telephone system could be by any suitable means. The radio telephone system includes two handsets 4,5. These can communicate with the base station using over the air radio communication slots.

In more detail, the base station 1 has an antenna 11, a transceiver 12, a connection 13 to the second telephone system and a processing unit 14 which includes a processor 14a and a memory unit 14b to allow it to be configured. The processing unit 14 controls the operation of the base station. It receives inputs from the connection 13 and the transceiver 12 and processes those inputs to control the transceiver and transmit data through the connection 13. The processing unit can control communications by the transceiver so as to transmit control signals to and receive control signals from the handsets, and can route communications from the connection 13 over the slots available to the transceiver. The handsets each have an antenna 41,51, a transceiver 42,52, a processing unit 43,53 (including a processor 43a,53a and a memory 43b,53b to allow them to be configured), a microphone 44,54, and a speaker 45,55. The processing units 43,53 can control the transceiver to transmit and receive control signals and can route communications between the microphone, the speaker and the transceiver. The speaker can be used as a ringer, to generate a ringing tone. A keypad 46,56 is provided on each handset to allow a user of the handset to answer a call by pressing answer key 47,57. This overall architecture is conventional.

There are 24 communication slots available per RF carrier for communications between the base station and the handsets. Each slot can carry signals in one direction only (either to or from the base station) so two slots are needed for each communication link (i.e. bi-directional link) between the base station and a handset.

Each handset can communicate signals to the base station and the base station can communicate signals to each handset according to the DECT signalling protocol, details of which are given in the ETS 300–175 standard document published by the European Telecommunications Standards Institute, which is incorporated herein by reference. One signal that can be transmitted by the base station is an {LCE-PAGE-REQUEST} signal. The {LCE-PAGE-REQUEST} signal is a mandatory part of the DECT GAP (Generic Access Profile) described in the document ETS 300–444 published by the European Telecommunications Standards Institute. The {LCE-PAGE-REQUEST} signal is a broadcast ("B-format") signal which includes two hexadecimal 'type digits' and at least 12 bits of 'TPUI type' information consisting of the last 12 least significant TPUI (Temporary Portable User Identity) bits. This signal will be described in more detail below.

When the base station receives an incoming telephone call (a call from outside the radio telephone system, or from one handset of the system to another) it first identifies whether the call is intended for a single handset or not. If it is intended for a single handset the system follows the same signalling procedure as described above in relation to the prior art. When the base station receives an incoming telephone call that is not intended for only one handset the base station should alert all the handsets to the call so that all the users are aware of the call and can answer it. To do this the base station transmits a "broadcast TPUI type" {LCE-PAGE-REQUEST} signal. In this signal both the type digits are hexadecimal F and the TPUI type is of one of the binary forms shown in table 1.

TABLE 1

| 1st Type Digit | 2nd Type Digit | TPUI type | Meaning |
|---|---|---|---|
| F | F | 000001000000 | Alerting on - pattern 0 |
| F | F | 000001000001 | Alerting on - pattern 1 |
| F | F | 000001000010 | Alerting on - pattern 2 |
| F | F | 000001000011 | Alerting on - pattern 3 |
| F | F | 000001000100 | Alerting on - pattern 4 |
| F | F | 000001000101 | Alerting on - pattern 5 |
| F | F | 000001000110 | Alerting on - pattern 6 |
| F | F | 000001000111 | Alerting on - pattern 7 |
| F | F | 000001001111 | Alerting off |
| F | F | 000001001000 | Alerting on - continuous |
| F | F | 000001001001 | Incoming call released from base station side - alerting off |
| F | F | 000001001010 | Incoming call has been answered - alerting off |
| F | F | all other values reserved for other functions | |

In accordance with the signalling protocols for DECT-like systems, since this is an {LCE-PAGE-REQUEST} signal its message exchange is dealt with by the NWK (Network) layer and does not involve the MAC (Medium Access Control) layer or require DLC (Data Link Control) links to be established between handsets and the base station.

The processing means of the handsets are configured to respond to these {LCE-PAGE-REQUEST} signals in the appropriate way, as illustrated by FIGS. 2 to 4.

FIG. 2 illustrates the communications between the line on which the incoming call is received (illustrated at 50), the base station (illustrated at 51) and the two handsets 4,5 (illustrated at 52 and 53) when the base station receives an incoming telephone call that is not intended for a single handset. When the ring-on signal 54 of the incoming call is received by the base station the processing means of the base station causes an {LCE-PAGE-REQUEST} signal 55 to be transmitted by the base station's transceiver and antenna. This {LCE-PAGE-REQUEST} signal has the type digits FF and the TPUI value 000001001000 to indicate "Alerting on—continuous". (If desired, other TPUI values indicating other ringing types as indicated in table 1 could be used). Signal 55 is received by the antennas and transceivers of the two handsets and communicated to the processing means of each handset. These interpret the signal as indicating "Alerting on—continuous" and in response cause the handsets' ringers (or other alerting means) to operate. When the ring-off signal 56 of the incoming call is received by the base station the processing means of the base station causes another {LCE-PAGE-REQUEST} signal 57 to be transmitted. This {LCE-PAGE-REQUEST} signal has the type digits FF and the TPUI value 000001001111 to indicate "Alerting off". On receiving this signal the processing units of the handsets cause the handsets' ringers to stop ringing. This procedure is repeated, so that the ringers operate intermittently, until the incoming call is answered or released.

FIG. 2 illustrates the sequence of operations when the call is answered by handset 5 (at 53). An {LCE-PAGE-RESPONSE} signal 58 is transmitted by handset 5 to establish a DLC communication link between the handset and the base station and request that the call is set up to that handset. This is received by the base station which, in response, stops ringing and transmits an off-hook signal 59 to answer the incoming call; and transmits an {LCE-PAGE-REQUEST} signal 60 with type digits FF and TPUI value 000001001010 to indicate "incoming call has been answered". The processing means of the handsets are configured so that the handsets will stop ringing and exit into the idle state if they receive an {LCE-PAGE-REQUEST} signal indicating "Incoming call has been answered" while they are ringing intermittently due to a broadcast TPUI type {LCE-PAGE-REQUEST} signal. Therefore, in response to the {LCE-PAGE-PAGE-REQUEST} signal 60 handset 4 stops ringing. The base station also transmits a {CC-SETUP} signal 61, identifying handset 5, in response to which handset 5 transmits a {CC-ALERTING} signal to the base station (to conform at this stage with the order of signalling in the prior art procedure), immediately followed by a {CC-CONNECT} signal. The base station replies with a {CC-CONNECT-ACK} signal and the voice (or data) signal of the incoming call is then connected over the communication link to handset 5.

The processing means of the handsets are configured so that when one of the handsets has been informed by an {LCE-PAGE-REQUEST} signal with type digits FF and TPUI value 000001001010 that the incoming call has been answered that handset will no longer transmit an {LCE-PAGE-RESPONSE} signal to attempt to answer the call. However, it is possible for a second handset to attempt to answer the incoming call before it has received that {LCE-PAGE-REQUEST} signal. FIG. 3 illustrates what happens in this case. The upper portion of FIG. 3 is the same as FIG. 2 as the incoming call is received and the handsets ring intermittently. The first handset to attempt to answer the call is handset 4 (at 52). It transmits an {LCE-PAGE-RESPONSE} signal 62 to set up a communication link in the normal way. This is received by the base station which, in response, transmits an off-hook signal 63 to answer the incoming call and then transmits a {CC-SETUP} signal 64, identifying handset 4. In response to an {LCE-PAGE-RESPONSE} signal 65 from handset 5 the base station transmits an {LCE-PAGE-REJECT} signal 66 to that handset, which causes it to stop ringing and rejects the attempt by that handset to answer the incoming call. Handset 5 then enters the idle state.

FIG. 4 illustrates what happens when the incoming call is released before it has been answered. Initially the handsets ring intermittently, as in the upper portions of FIGS. 2 and 3. When the incoming call is released the base station transmits an {LCE-PAGE-REQUEST} signal 67 with type digits FF and TPUI value 000001001001 to indicate that the incoming call has been released. The processing means of the handsets are configured to cause the handsets to stop ringing in response to such a signal and exit into the idle state waiting for another call.

In view of the foregoing description it will be evident to a person skilled in the art that various modifications may be made within the scope of the invention. In particular the invention is suitable for use under other DECT-like protocols including WCPE (Wireless Customer Premises Equipment), the details of which are given in the appropriate standards document published by the TIA, PHS (Personal Handyphone System) and DCT900.

The present invention includes any novel features or combinations of features disclosed herein either explicitly or implicitly and any generalisations thereof irrespective of whether they relate to the invention as claimed or mitigate any or all of the problems addressed by the invention as claimed.

What is claimed is:

1. A base station for a digital cordless radio telephone system comprising at least one handset, the base station comprising base station communication means for transmitting signals to the handset; and base station processing means responsive to an incoming call to the base station for causing the base station communication means to transmit a page request signal of a type that specifies no single handset, in which first and second type digits of the page request signal are both hexadecimal F.

2. A base station according to claim 1, in which the base station processing means is responsive to a signal from a first handset requesting a call to be set up while the incoming call remains unanswered for causing the base station to route the call to the first handset.

3. A base station as claimed in claim 2, wherein the signal requesting a call to be set up is a signal for establishing bi-directional communication with the base station.

4. A base station according to claim 3, wherein the signal requesting a call to be set up is a page response signal.

5. A base station according to claim 2, in which the base station processing means is responsive to a signal from a second handset requesting a call to be set up while the incoming call remains unanswered for causing the base station to transmit a signal to reject the request from the second handset.

6. A base station according to claim 1, in which the base station processing means is responsive to the incoming call being released for causing the base station communication means to transmit a signal indicating that the call has been released.

7. A base station according to claim 1, in which a seventh least significant TPUI bit of the page request signal is 1.

8. A base station according to claim 1, in which four least significant TPUI bits of the page request signal specify a mode of user-alerting to be used by the handset.

9. A base station according to claim 1, in which a data link control link between the base station and the at least one handset is unnecessary for the base station communication means to transmit the page request signal.

10. A base station according to claim 1 wherein the digital cordless radio telephone system is a DECT radio telephone system.

11. A base station according to claim 1 wherein the digital cordless radio telephone system is a WCPE radio telephone system.

12. A base station according to claim 1 wherein the digital cordless radio telephone system is a PHS radio telephone system.

13. In a digital cordless radio telephone system of a type that comprises a base station that is coupled to a plurality of user handsets through a digital radio link having N slots, a method for processing an incoming call to the base station, the method comprising the steps of:

in response to an incoming call to the base station, transmitting a message from the base station that includes information for specifying that the message is a broadcast message for all user handsets, the broadcast message further including information for specifying a user handset alerting command;

receiving the broadcast message with all active user handsets; and in each user handset receiving the broadcast message, responding to the alerting command by activating a user handset alerting means in accordance with the user handset alerting command, wherein a total number of user handsets that respond to the alerting command is not constrained by the value of N.

14. A base station for a digital cordless radio telephone system comprising at least one handset, the base station comprising base station communication means for transmitting signals to the handset; and base station processing means responsive to an incoming call to the base station for causing the base station communication means to transmit a page request signal of a type that specifies no single handset, in which a seventh least significant TPUI bit of the page request signal is 1.

15. A base station for a digital cordless radio telephone system comprising at least one handset, the base station comprising base station communication means for transmitting signals to the handset; and base station processing means responsive to an incoming call to the base station for causing the base station communication means to transmit a page request signal of a type that specifies no single handset, in which four least significant TPUI bits of the page request signal specify a mode of user-alerting to be used by the handset.

16. A base station for a digital cordless radio telephone system comprising at least one handset, the base station comprising base station communication means for transmitting signals to the handset; and base station processing means responsive to an incoming call to the base station for causing the base station communication means to transmit a page request signal of a type that specifies no single handset, in which a data link control link between the base station and the at least one handset is unnecessary for the base station communication means to transmit the page request signal.

* * * * *